United States Patent Office 2,748,727
Patented June 5, 1956

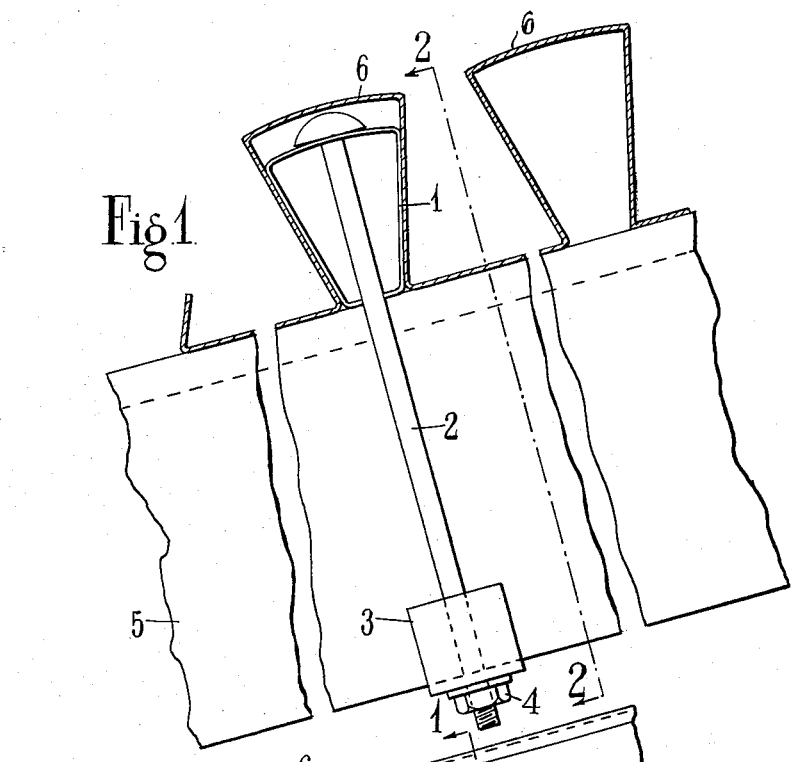
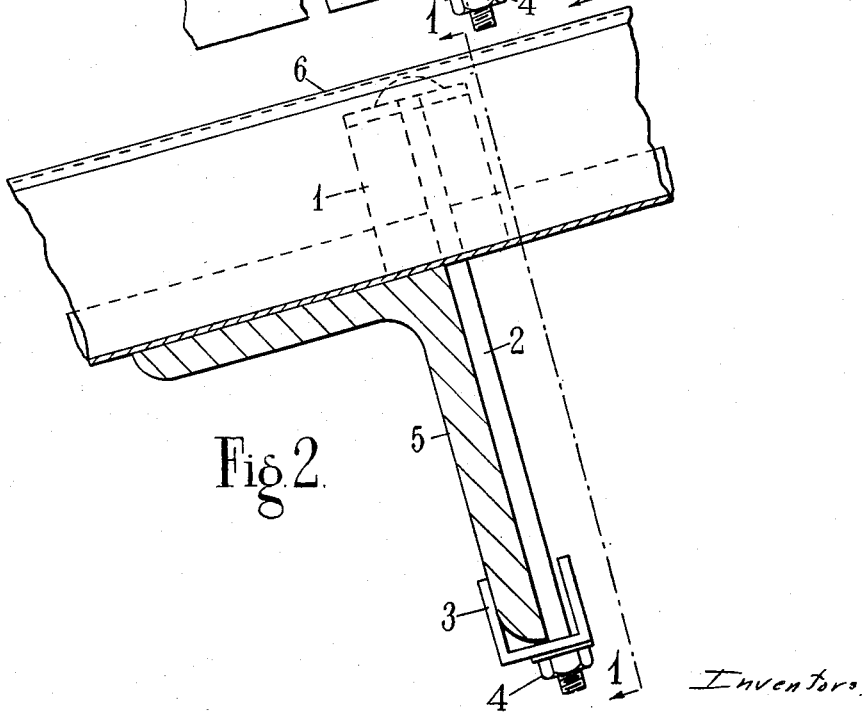

2,748,727

ARRANGEMENT FOR FIXING CORRUGATED SHEETS IN POSITION

Herbert Leonard Plummer and Davis Lambert Irwin, London, England

Application May 12, 1952, Serial No. 287,326

Claims priority, application Great Britain May 18, 1951

3 Claims. (Cl. 108—33)

This invention relates to arrangements for fixing undercut corrugated sheets in position.

Such sheets may be of metal, asbestos cement or plastic.

By undercut is meant that the side walls of the corrugations are inclined toward each other in the direction of the underside of the sheet and opened on said underside for passage of a bolt.

The invention consists of an arrangment for fixing corrugated sheets in position, comprising a clip for insertion in the corrugations and a bolt for attaching the clip to the purlins or the like in which the clip is adapted on tightening of the bolt to expand laterally to grip the corrugations so as to hold the sheets firmly in position.

The invention further consists of the combination of a clip for insertion in the corrugations and a bolt for attaching the clip to purlins or the like in which the clip comprises a member which is bent or curved so that its convex side will face inwardly of the corrugation and so that pressure on its generally convex side will tend to increase the distance between its ends so that the clip acts as an expanding member against the sides of the corrugation so as to grip the same in surface contact, and in which the bolt is passed through a centrally disposed aperture in the bent or curved member with its head on the generally convex side thereof and is provided with suitable means at its other end for fixing to a purlin or the like.

By this means when the clips and bolts are in use securing a corrugated sheet any pressure on the generally convex side of the clip resulting from tightening of the bolt or wind action on the sheet will tend to force the ends of the central members of the clips into closer contact with the sides of the corrugations of the sheet, thereby holding the sheet more securely in position.

The bent or curved member of the clip may be curved in the form of an arc of a circle or in the form of a figure having two or more mutually inclined parts. The central member is not necessarily only bent in one direction; thus for example, the central part might be formed by bending in the opposite direction to form a recess for the bolt head provided that such an arrangement gave the desired result expressed above.

Conveniently, limb members extend from the respective ends of the clip member on the generally concave side thereof and inclined towards one another on that side.

If desired, the extremities of the limbs of the clip could be turned inward, or even joined, leaving a suitable passage for the bolt.

The invention will be further described with reference to an embodiment shown in the accompanying drawings.

Figure 1 is a section on the line 1—1 of Figure 2 showing the clip in use.

Figure 2 is a section on the line 2—2 of Figure 1.

In the embodiment the clip 1 is made of galvanised iron strip bent to have an outwardly arced end, say, three inches across, straight opposite end, say, one inch and a half long, and sides to complete an open wedge-shaped structure; the two ends of the strip used being welded or otherwise joined together, and the two ends of the clip being pierced for passage of the bolt stem.

At its screwed end the bolt 2 is suitably fitted with a U-shaped clip 3 the inside of which faces towards the head of the bolt and through which the bolt stem passes by a hole off-set from the centre of the central member of the U-shaped clip and is then provided with a nut 4.

By this means the bolt stem can lie along one link of a purlin 5 and the U-shaped clip 3 can be held in position around the edge of the purlin.

Conveniently, the nut may be a lock-nut which would only revolve in one direction, i. e. in the line beneath which it tightens up the fixing arrangement.

When the nut is tightened the clip 1 grips the corrugated roof sheeting 6 as will be apparent from the drawings.

Various other modifications could be made within the scope of the invention.

We claim:

1. An arrangement for fixing an undercut corrugated sheet in position comprising an undercut corrugated sheet, a clip inserted in an undercut corrugation thereof and a bolt attaching the clip to purlins or like support in which the clip comprises a member which is bent or curved with its convex side facing inwardly of the corrugation so that pressure on its generally convex side will tend to increase the distance between its ends so that the clip acts as an expanding member against the sides of the corrugation so as to grip the same in surface contact, the clip further comprising limb members extending on the generally concave side of said member from the ends thereof inclined towards one another on that side, the bolt being passed through a centrally disposed aperture in the first-mentioned member with its head on the generally covex side thereof.

2. An arrangement as claimed in claim 1 in which the bent or curved member of the clip is curved in the form of an arc of a circle.

3. An arrangement as claimed in claim 1 in which the extremities of the limbs are joined leaving a suitable passage for the bolt.

References Cited in the file of this patent

UNITED STATES PATENTS 2,360,879     Kroier _____ Oct. 24, 1944

FOREIGN PATENTS 492,963     Great Britain _____ 1938